United States Patent
Ishii

(10) Patent No.: US 9,426,354 B2
(45) Date of Patent: Aug. 23, 2016

(54) IMAGE PROCESSING APPARATUS, IMAGE SENSING APPARATUS, CONTROL METHOD, AND RECORDING MEDIUM

(71) Applicant: CANON KABUSHIKI KAISHA, Tokyo (JP)

(72) Inventor: Hirokazu Ishii, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/682,687

(22) Filed: Apr. 9, 2015

(65) Prior Publication Data

US 2015/0215525 A1    Jul. 30, 2015

Related U.S. Application Data

(63) Continuation of application No. 13/737,462, filed on Jan. 9, 2013, now Pat. No. 9,025,821.

(30) Foreign Application Priority Data

Jan. 13, 2012    (JP) .................................. 2012-005660

(51) Int. Cl.
*G06K 9/00* (2006.01)
*H04N 5/232* (2006.01)
(Continued)

(52) U.S. Cl.
CPC ............ *H04N 5/23212* (2013.01); *G06K 9/78* (2013.01); *H04N 5/23219* (2013.01); *H04N 5/378* (2013.01)

(58) Field of Classification Search
CPC ............. G06K 9/00; G06N 5/00; H04N 5/00
USPC ........ 382/103, 107, 136; 348/154, 155, 169, 348/170, 171, 172, 352
See application file for complete search history.

(56) References Cited

U.S. PATENT DOCUMENTS 8,634,015 B2 * 1/2014 Kimura .................... G02B 7/28
                                                              348/335
9,001,262 B2 * 4/2015 Onuki ................ H04N 5/23212
                                                              348/222.1
(Continued)

FOREIGN PATENT DOCUMENTS

CN          101339349 A        1/2009
JP          2006-101186 A      4/2006
(Continued)

OTHER PUBLICATIONS

Jul. 31, 2015 Chinese Office Action that issued in Chinese Patent Application No. 201310011804.7.
(Continued)

*Primary Examiner* — Abolfazl Tabatabai
(74) *Attorney, Agent, or Firm* — Cowan, Liebowitz & Latman, P.C.

(57) ABSTRACT

For obtained raw moving image data, an image processing apparatus decides a focal distance at which a specific subject is focused on. The respective pixels of image signals in each frame of the raw moving image data correspond to light beams having different combinations of pupil regions through which the light beams have passed, and incident directions in an imaging optical system. More specifically, the image processing apparatus generates, from the image signals of each frame of the raw moving image data, a pair of images corresponding to light beams having passed through different pupil regions, and decides, based on a defocus amount at the position of the specific subject that is calculated from the pair of images, the focal distance at which the specific subject is focused on.

12 Claims, 10 Drawing Sheets

(51) Int. Cl.
*G06K 9/78* (2006.01)
*H04N 5/378* (2011.01)
*H04N 5/225* (2006.01)

(56) References Cited

U.S. PATENT DOCUMENTS

| 9,025,821 B2* | 5/2015 | Ishii | H04N 5/23212 |
| | | | 348/169 |
| 2010/0128145 A1 | 5/2010 | Pitts et al. | |
| 2010/0188522 A1 | 7/2010 | Ohnishi et al. | |
| 2010/0215354 A1 | 8/2010 | Ohnishi | |

FOREIGN PATENT DOCUMENTS

| JP | 2010-191883 A | 9/2010 |
| JP | 2011-097645 A | 5/2011 |

OTHER PUBLICATIONS

Oct. 2, 2015 Japanese Office Action that issued in Japanese Patent Application No. 2012-005660.

* cited by examiner

F I G. 6
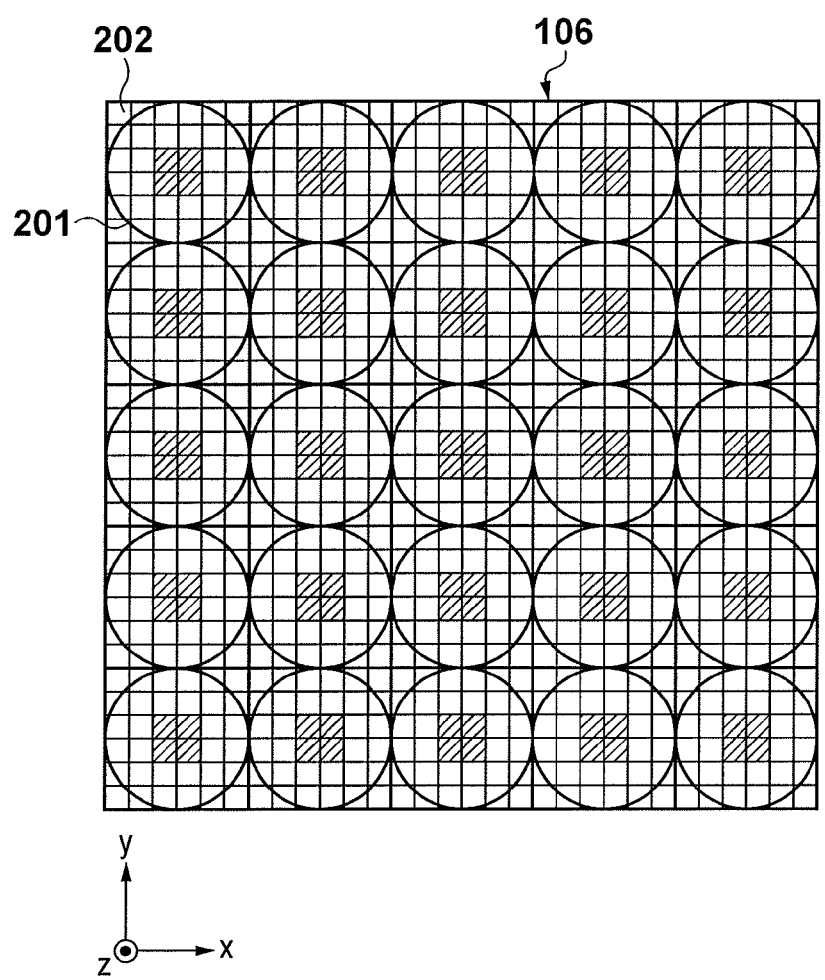

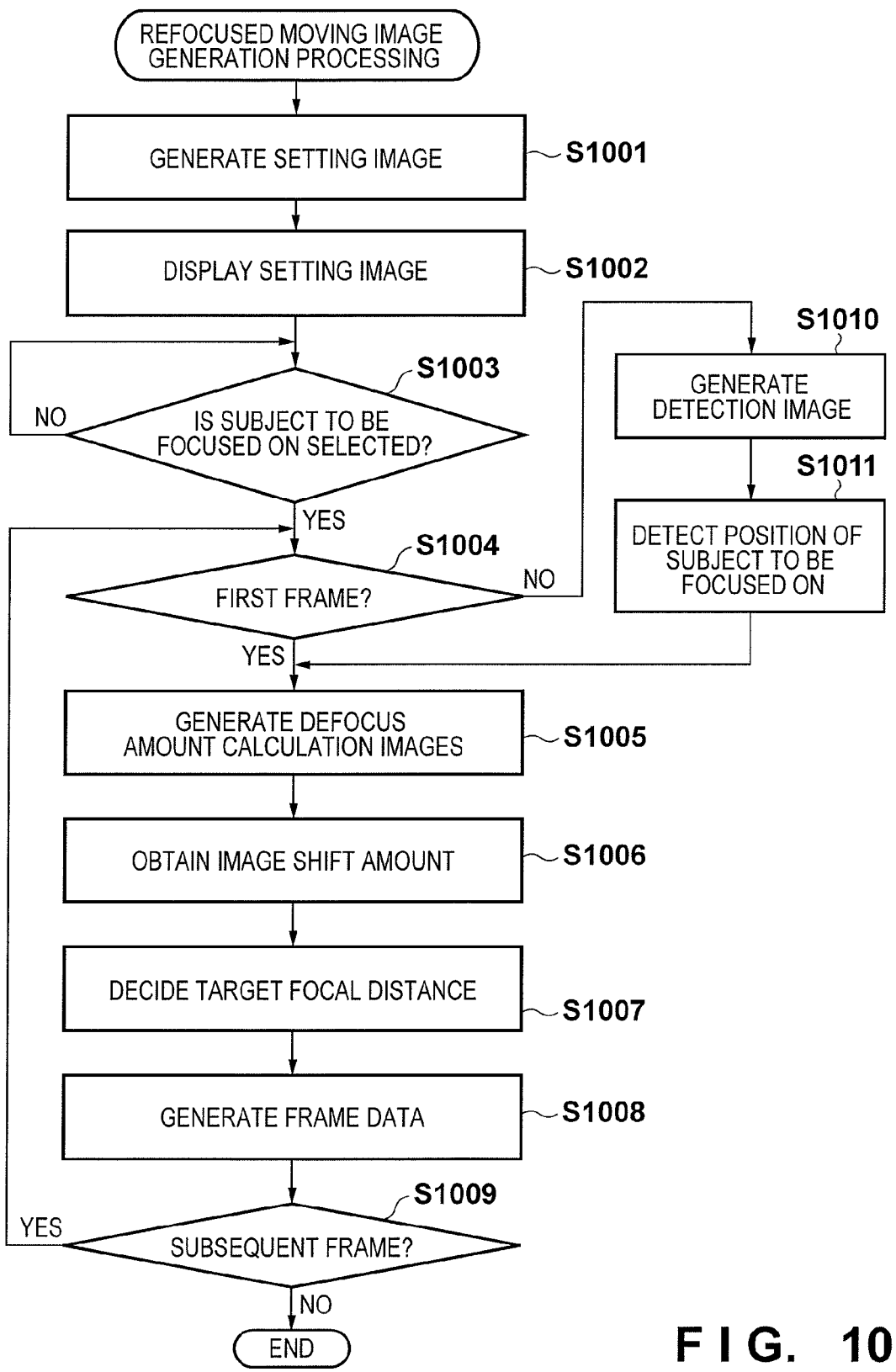
F I G. 10

IMAGE PROCESSING APPARATUS, IMAGE SENSING APPARATUS, CONTROL METHOD, AND RECORDING MEDIUM

CROSS-REFERENCE TO RELATED APPLICATION

This application is a continuation of application Ser. No. 13/737,462, filed Jan. 9, 2013, the entire disclosure of which is hereby incorporated by reference.

BACKGROUND OF THE INVENTION

1. Field of the Invention

The present invention relates to an image processing apparatus, image sensing apparatus, control method, and recording medium, and particularly to a technique of generating, from raw data after shooting, an image focused on at an arbitrary focal distance.

2. Description of the Related Art

There has recently been proposed a technique of recording the intensity distribution and traveling direction of light as raw data upon shooting, and generating, from the recorded raw data, an image focused on at an arbitrary focal distance in an image sensing apparatus such as a digital camera.

"'Light Field Photography with a Hand-Held Plenoptic Camera', Stanford University Computer Science Tech Report CSTR 2005-02 by Ren Ng, et al." discloses a method (Light Field Photography) of forming images from light beams having passed through different pupil regions of an imaging lens on the respective pixels of an image sensor via a microlens array, thereby splitting and recording light beams entering from various directions. In obtained raw data, adjacent pixels record light beams entering from different directions. By extracting light beams in the same direction from pixels corresponding to respective microlenses, an image shot from this direction can be generated. Further, an arbitrary focal distance is set, and outputs from pixels which record light beams having passed through one point on the focal plane at this focal distance are added. This enables pseudo-generating the pixels of an image focused on at a specific focal distance after shooting.

The method in "Light Field Photography with a Hand-Held Plenoptic Camera" is also applicable to recording of a moving image. More specifically, a moving image focused on at an arbitrary focal distance can be generated from raw moving image data after shooting.

In a moving image, a subject moves during shooting. Hence, in moving image shooting by a general image sensing apparatus, the focal distance of the optical system is changed during shooting in accordance with the movement of a subject to be focused on.

However, when generating a moving image focused on at an arbitrary focal distance from raw moving image data recorded using a method as described in "Light Field Photography with a Hand-Held Plenoptic Camera", there has not been proposed a method of changing a focal distance in accordance with the movement of a subject to be focused on.

SUMMARY OF THE INVENTION

The present invention has been made to solve the conventional problems. The present invention provides an image processing apparatus, image sensing apparatus, control method, and recording medium for tracking an arbitrary subject, and generating a moving image to be focused on from raw moving image data after shooting.

The present invention in its first aspects provides an image processing apparatus comprising: an obtaining unit configured to obtain raw moving image data shot by an image sensing apparatus in which respective pixels of image signals of each frame correspond to light beams having different combinations of pupil regions through which the light beams have passed, and incident directions in an imaging optical system of the image sensing apparatus; a detection unit configured to detect a position of a subject to be focused on in each frame of the raw moving image data obtained by the obtaining unit; a decision unit configured to decide a focal distance at which the subject to be focused on is focused on; and a generation unit configured to generate, from the raw moving image data, a moving image in which each frame is focused on at the focal distance decided by the decision unit, wherein the decision unit generates, from the image signals of each frame of the raw moving image data, a pair of images respectively corresponding to light beams having passed through different pupil regions of the imaging optical system, and decides, based on a defocus amount at a position of the subject to be focused on that is calculated from the pair of images, the focal distance at which the subject to be focused on is focused on.

Further features of the present invention will become apparent from the following description of exemplary embodiments (with reference to the attached drawings).

BRIEF DESCRIPTION OF THE DRAWINGS

FIG. 6 is a view for explaining pixels used to generate a through image according to the embodiment of the present invention;

FIG. 10 is a flowchart exemplifying refocused moving image generation processing to be performed by the digital camera 100 according to the embodiment of the present invention.

DESCRIPTION OF THE EMBODIMENTS

An exemplary embodiment of the present invention will now be described in detail with reference to the accompanying drawings. The embodiment set forth will explain an example in which the present invention is applied to a digital camera capable of generating a moving image in which the focal distance is changed after shooting, as an example of an image sensing apparatus and image processing apparatus. However, the present invention is applicable to an arbitrary device capable of generating raw moving image data from which a moving image focused on at an arbitrary focal distance can be generated after shooting, or generating a moving image focused on at an arbitrary focal distance from the raw moving image data.

In this specification, "raw still image data" or "raw moving image data" (both of them will be referred to raw data hereinafter) means an image or moving image obtained by shooting using a microlens array in which a plurality of photoelectric converters of an image sensor are assigned to each microlens, which will be described later. Respective photoelectric converters assigned to one microlens receive light beams having passed through different regions of the exit pupil of an imaging optical system. In raw data, the images of adjacent pixels are not always continuous in pixels corresponding to outputs from photoelectric converters assigned to one microlens. For this reason, raw data in the embodiment undergoes processing of generating an image focused on at a predetermined focal distance after shooting, thereby converting the image into an image in which the images of adjacent pixels become continuous. In this specification, the processing of deciding a focal distance after shooting and generating an image focused on at the focal distance from raw data will be expressed as "refocusing".

<Arrangement of Digital Camera 100>

Figure 1:
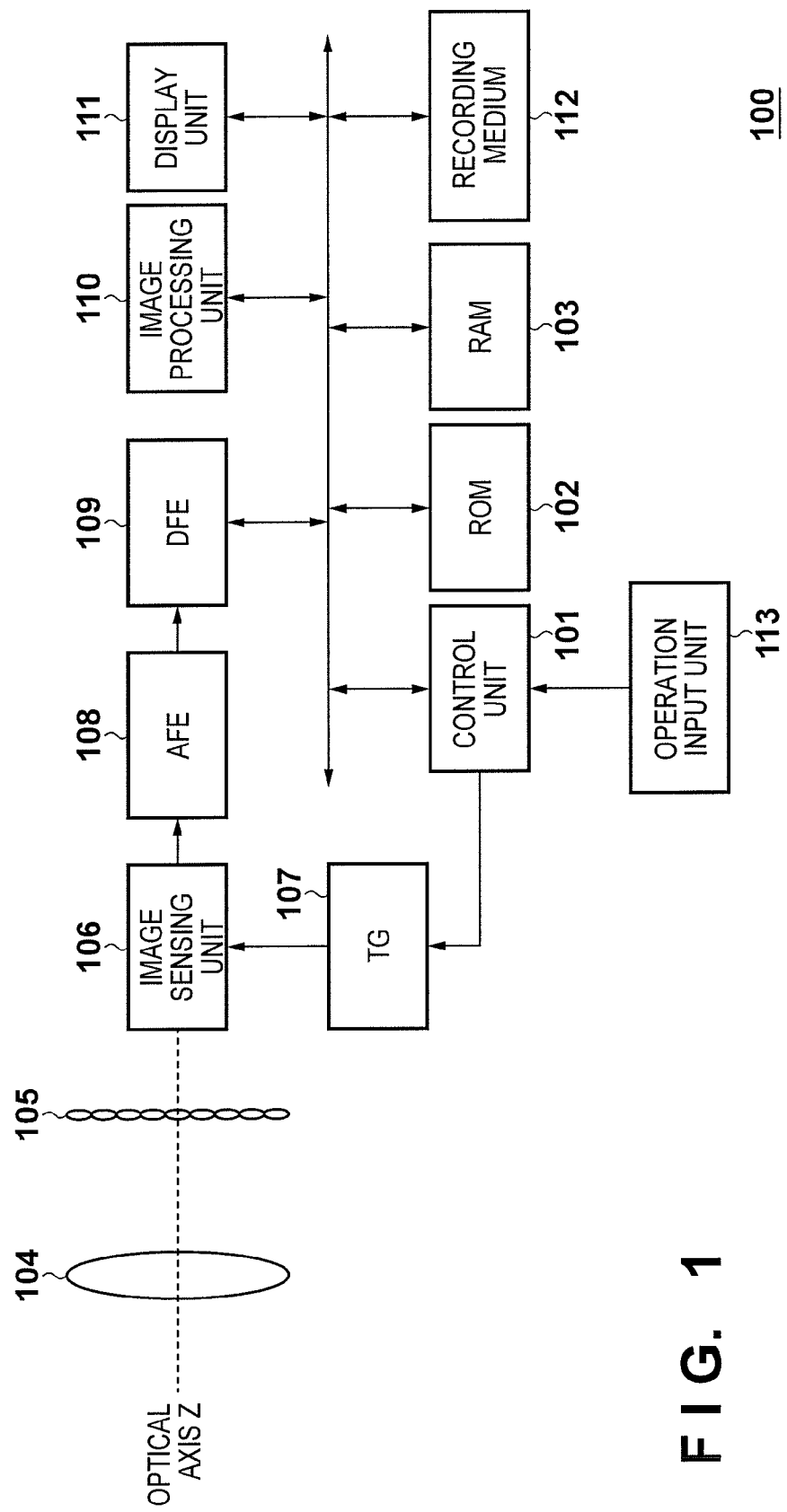
FIG. 1 is a block diagram showing the functional arrangement of a digital camera 100 according to an embodiment of the present invention.

FIG. 1 is a block diagram showing the functional arrangement of a digital camera 100 according to the embodiment of the present invention.

A control unit 101 is, for example, a CPU. The control unit 101 controls the operations of the respective blocks of the digital camera 100. More specifically, the control unit 101 controls the operations of the respective blocks by reading out the operation program of shooting processing or refocused moving image generation processing (to be described later) that is stored in a ROM 102, extracting it in a RAM 103, and executing it.

The ROM 102 is, for example, a rewritable nonvolatile memory. The ROM 102 stores the operation programs of the respective blocks of the digital camera 100, parameters required for the operations of the respective blocks, and the like.

The RAM 103 is a volatile memory. The RAM 103 is used not only as an extraction area for the operation programs of the respective blocks of the digital camera 100, but also as a storage area for storing intermediate data and the like output during the operations of the respective blocks.

An image sensing unit 106 is an image sensor such as a CCD sensor or CMOS sensor. Upon receiving a timing signal output from a TG 107 in accordance with an instruction from the control unit 101, the image sensing unit 106 photoelectrically converts an optical image formed on the photoelectric converter surface of the image sensor by an imaging optical system 104, and outputs an analog image signal. The imaging optical system 104 includes, for example, an objective lens, focus lens, and aperture. The digital camera 100 according to the embodiment includes a microlens array 105 interposed between the imaging optical system 104 and the image sensor on the optical axis, in addition to microlenses arranged for the photoelectric converters of the image sensor.

(Relationship Between Microlens and Photoelectric Converter)

The microlens array 105 which is interposed between the imaging optical system 104 and the image sensor on the optical axis in the digital camera 100 according to the embodiment will be explained with reference to the drawings.

Figure 2:
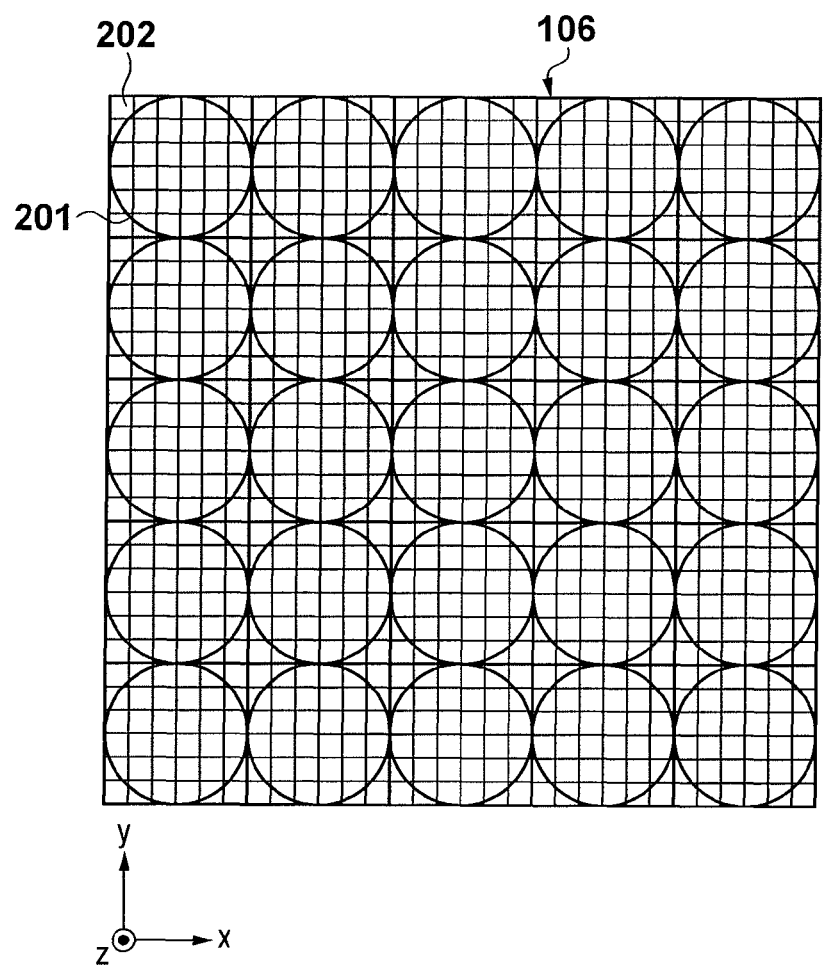
FIG. 2 is a view for explaining the relationship between a microlens array 105 and the photoelectric converter of an image sensor according to the embodiment of the present invention.

As shown in FIG. 2, the microlens array 105 according to the embodiment is formed from a plurality of microlenses 201. In FIG. 2, the optical axis of the imaging optical system 104 is set as the z-axis, the horizontal direction at the lateral position of the digital camera 100 is set as the x-axis, and the vertical direction is set as the y-axis. In the example of FIG. 2, the microlens array 105 is formed from 5×5 microlenses 201 for simplicity. However, the arrangement of the microlens array 105 is not limited to this.

In FIG. 2, photoelectric converters 202 of the image sensor which forms the image sensing unit 106 are represented by a matrix. A predetermined number of photoelectric converters 202 correspond to each microlens 201. In the example of FIG. 2, the photoelectric converters 202 of 6×6=36 pixels correspond to one microlens 201. Light beams having passed through one microlens 201 are split in accordance with their incident directions, and the split light beams form images on corresponding photoelectric converters 202.

Figure 3:
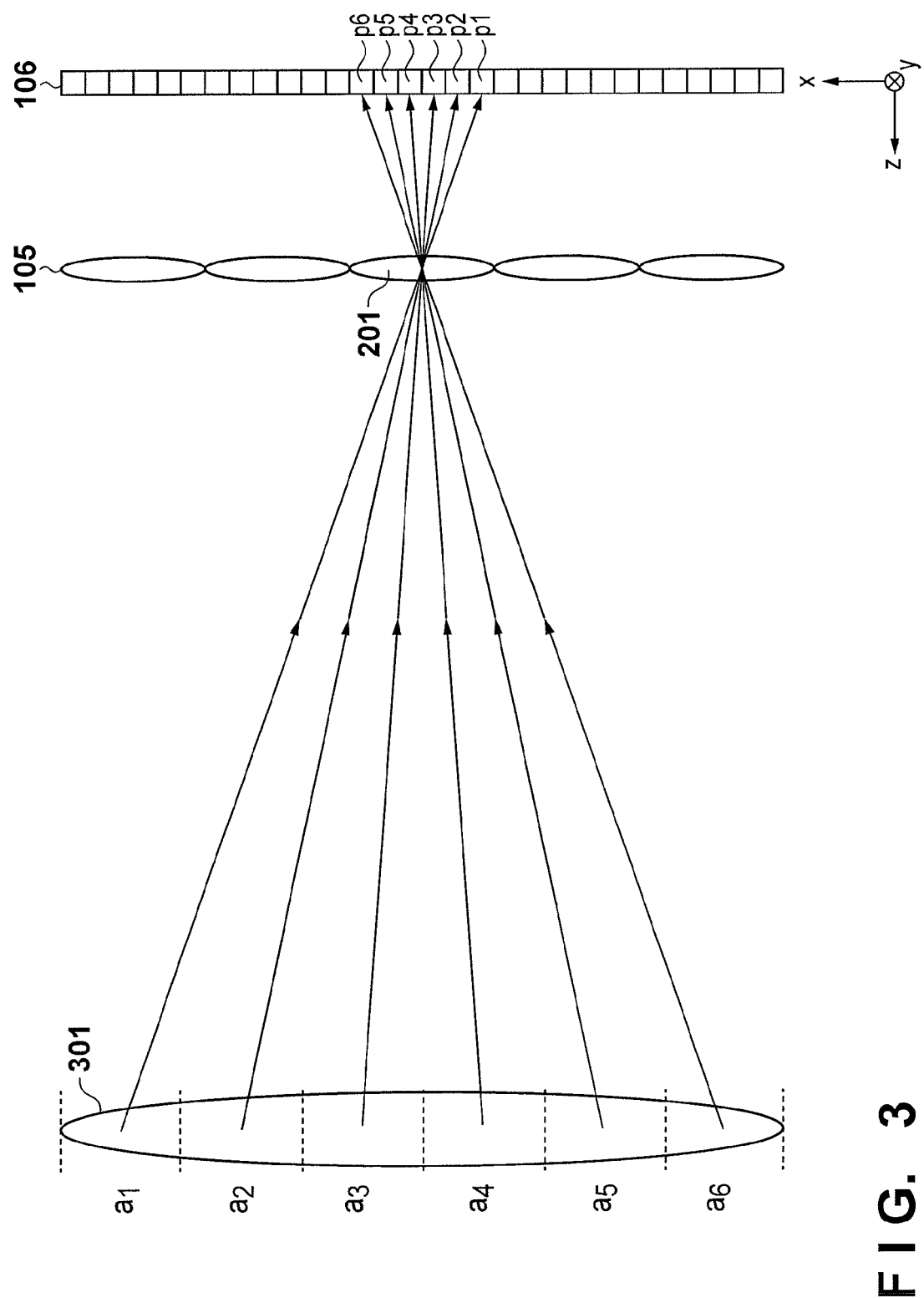
FIG. 3 is another view for explaining the relationship between the microlens array 105 and the photoelectric converter of the image sensor according to the embodiment of the present invention.

FIG. 3 shows light beams entering photoelectric converters $202p_1$ to $202p_6$ corresponding to one microlens 201. FIG. 3 exemplifies the light paths of light beams entering the respective photoelectric converters 202 when viewed from the vertical direction at the lateral position of the digital camera 100. As shown in FIG. 3, light beams having passed through regions $a_1$ to $a_6$ obtained by horizontally dividing an exit pupil 301 of the imaging optical system 104 into six enter the horizontally aligned photoelectric converters $202p_1$ to $202p_6$ via one microlens 201. Note that a numeral attached to each region represents the correspondence with the photoelectric converter 202 which receives a light having passed through the region.

Figure 4:
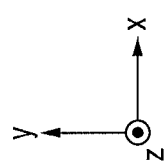
FIGS. 4A and 4B are views for explaining the relationship between the pupil region of an imaging lens and photoelectric converters corresponding to one microlens according to the embodiment of the present invention.

In the example of FIG. 3, the light paths of light beams entering the respective photoelectric converters 202 when viewed from the vertical direction are shown. However, light beams are split not only in the horizontal direction, but also in the vertical direction. That is, when the exit pupil of the imaging optical system 104 is divided into regions as shown in FIG. 4A when viewed from the image sensor, light beams having passed through the respective regions enter photoelectric converters having the same identification numbers as those of the regions, out of the photoelectric converters 202 as shown in FIG. 4B. Assume that the imaging optical system 104 and each microlens of the microlens array 105 have almost the same f-number.

An AFE 108 and DFE 109 perform correction processing and the like for an image signal generated by the image sensing unit 106. More specifically, the AFE 108 performs reference level adjustment (clamp processing) and A/D conversion processing for an analog image signal output from the image sensing unit 106, and outputs digital image data (raw still image data or raw moving image data) to the DFE 109. The DFE 109 corrects a small shift of the reference level of the received raw data, and the like.

An image processing unit 110 applies various image processes such as color conversion processing for raw data having undergone correction processing by the DFE 109. In the embodiment, the image processing unit 110 also performs processing of generating an image (refocused image) focused on at an arbitrary focal distance from raw data. Generation of an image focused on at an arbitrary focal distance adopts, for example, the method "Light Field Photography" as described in "Light Field Photography with a Hand-Held Plenoptic Camera".

A display unit 111 is a display device in the digital camera 100, such as a compact LCD. The display unit 111 displays an image focused on at an arbitrary focal distance that is generated by the image processing unit 110. As described above, the images of adjacent pixels are not always coupled in image data obtained by A/D-converting an analog image signal output from the image sensing unit 106 in the embodiment. Thus, the display unit 111 displays not the image data obtained by A/D conversion, but image data generated by the image processing unit 110.

A recording medium 112 is a built-in memory in the digital camera 100, or a recording device detachably connected to the digital camera 100, such as a memory card or HDD. The recording medium 112 records raw still image data, raw moving image data, and an image and moving image focused on at an arbitrary focal distance that are generated from these raw data.

An operation input unit 113 is a user interface in the digital camera 100, such as a power button or shutter button. When the operation input unit 113 detects that the user has operated the user interface, it outputs a control signal corresponding to the operation to the control unit 101.

<Moving Image Shooting Processing>

Figure 5:
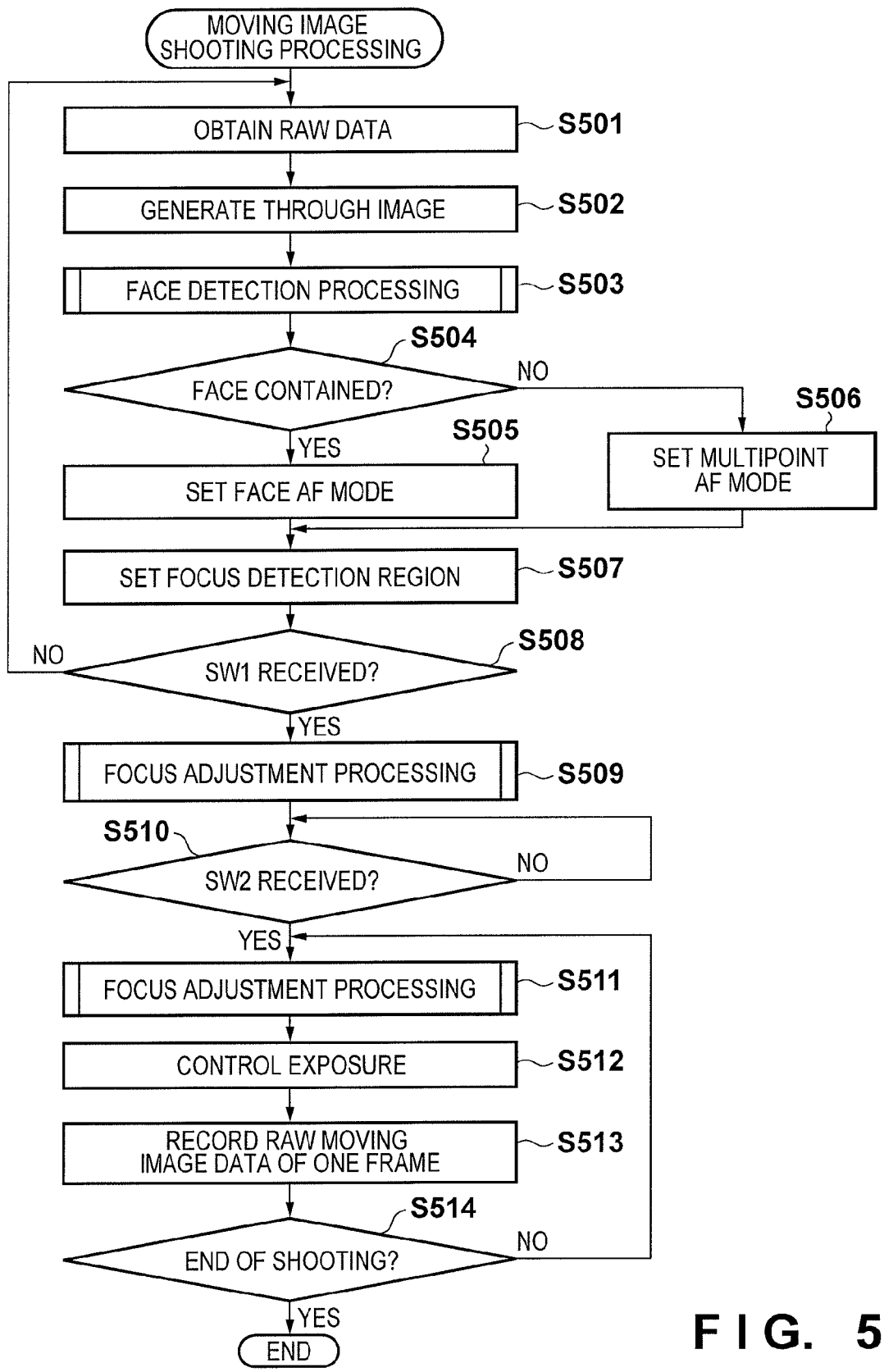
FIG. 5 is a flowchart exemplifying moving image shooting processing to be performed by a digital camera 100 according to the embodiment of the present invention.

Moving image shooting processing by the digital camera 100 having the above arrangement according to the embodiment will be explained in detail with reference to the flowchart of FIG. 5. Processing corresponding to this flowchart can be implemented by, for example, reading out a corresponding processing program stored in the ROM 102, extracting it in the RAM 103, and executing it by the control unit 101. In the following description, the moving image shooting processing starts when, for example, the digital camera 100 is activated while it is set in the moving image shooting mode.

In step S501, the control unit 101 obtains raw data pertaining to an image signal output from the image sensing unit 106. More specifically, the control unit 101 obtains raw data which has been A/D-converted by the AFE 108 and undergone correction processing by the DFE 109. The control unit 101 stores the obtained raw data in the RAM 103.

In step S502, the control unit 101 controls the image processing unit 110 to generate an image (through image) to be displayed on the display unit 111. More specifically, the control unit 101 transmits the raw data stored in the RAM 103 to the image processing unit 110, and controls the image processing unit 110 to generate a through image.

In the embodiment, the images of adjacent pixels are not continuous in raw data, as described above, so the through image is generated a follows. FIG. 6 is a view showing pixels used to generate a through image in the embodiment. When an image is sensed via the microlens array 105, as in the digital camera 100 of the embodiment, the number of pixels of an image (for example, a through image or an image focused on at an arbitrary focal distance) converted from obtained raw data is a fixed value. When conversion into an image is not accompanied by enlargement/reduction processing or the like, the number of pixels of an obtained image becomes equal to that of microlenses 201 of the microlens array 105. That is, one pixel of an image obtained by conversion is generated from pixels corresponding to each microlens 201.

As shown in FIG. 6, each pixel of a through image generated in the embodiment is generated using pixels positioned at the center out of pixels corresponding to each microlens 201 of the microlens array 105. That is, each pixel of the through image corresponds to a light beam having passed through the center region of the exit pupil of the imaging optical system 104. The through image generated in the embodiment is therefore equivalent to an image obtained when the imaging optical system 104 is stopped down, and has an advantage of a large depth of field. A large depth of field makes it easy to detect the faces of persons at various distances from the digital camera 100 within the shooting range in face detection processing (to be described later).

The image processing unit 110 generates each pixel of the through image from received raw data by, for example, averaging the pixel values of four pixels positioned at the center out of pixels corresponding to each microlens 201, as shown in FIG. 6. The through image generated by the image processing unit 110 is stored in the RAM 103 by the control unit 101, transmitted to the display unit 111, and displayed.

In step S503, the control unit 101 performs face detection processing to search a detection image generated as the through image for a person face. More specifically, the control unit 101 searches for the face image (face region) of a person contained in the through image by pattern matching using, as a template, a face pattern which is stored in advance and represents a person face distribution.

In step S504, the control unit 101 determines whether the through image contains a face region. If the control unit 101 determines in the face detection processing of step S503 that the through image contains a face region, it shifts the process to step S505; if it determines that the through image does not contain a face region, to step S506.

In step S505, the control unit 101 sets the focus adjustment mode of the digital camera 100 to the "face AF mode" in which the focal distance is adjusted for the face region of a person. In step S506, the control unit 101 sets the focus adjustment mode of the digital camera 100 to the "multipoint AF mode". The multipoint AF mode is a mode in which the shooting region is divided into, for example, 3×5=15 regions, and the focus lens driving position is decided to adjust the focus based on a focus detection result in each divided region and subject brightness information.

In step S507, the control unit 101 sets a focus detection region. More specifically, the control unit 101 sets a detected face region as the focus detection region when the focus adjustment mode is the face AF mode, and a plurality of divided regions as the focus detection region when it is the multipoint AF mode.

In step S508, the control unit 101 determines whether an operation to prepare for moving image shooting has been input. More specifically, the control unit 101 determines whether it has received a control signal SW1 which is output from the operation input unit 113 when the user presses the shutter button halfway. If the control unit 101 determines that it has received the signal SW1, it shifts the process to step S509; if it determines that it has not received the signal SW1, returns the process to step S501.

In step S509, the control unit 101 performs focus adjustment processing based on the defocus amount of the subject in the focus detection region. The digital camera 100 according to the embodiment can generate, from raw moving image data obtained by shooting, a moving image focused on at a focal distance set by refocused moving image generation processing (to be described later) after shooting. Hence, the digital camera 100 need not focus on a specific subject at the stage of shooting. However, a moving image focused on at an arbitrary focal distance that is generated from raw data has a settable focal distance range (focus range capable of refocusing) dependent on the microlens array 105. In the embodiment, the control unit 101 performs the following focus adjustment processing and decides a focal distance to be set in shooting so that the focal distance of a subject to be focused on after shooting falls within the settable focus range.

(Focus Adjustment Processing)

Figure 7:
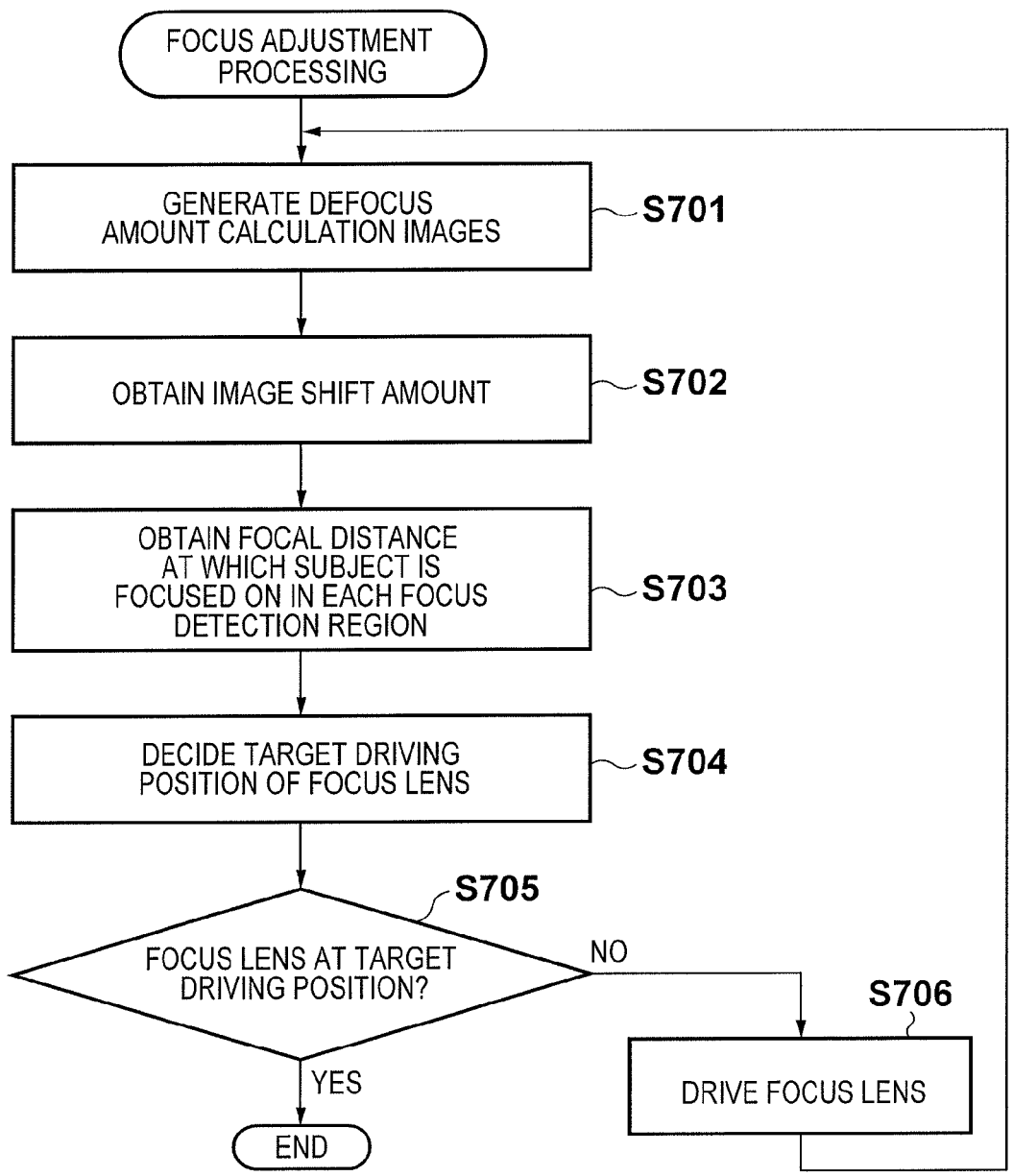
FIG. 7 is a flowchart exemplifying focus adjustment processing to be performed by the digital camera 100 according to the embodiment of the present invention.

Focus adjustment processing to be performed in this step will be explained in detail with reference to the flowchart of FIG. 7.

Figure 8:
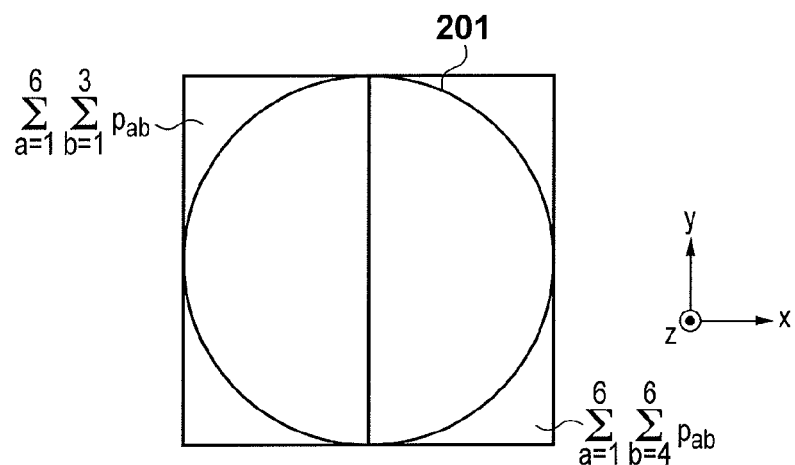
FIG. 8 is a view for explaining two images used to calculate a defocus amount according to the embodiment of the present invention.

In step S701, the control unit 101 transmits raw data stored in the RAM 103 to the image processing unit 110, and controls the image processing unit 110 to generate a pair of defocus amount calculation images for each focus detection region. In the embodiment, the defocus amount of a subject in the focus detection region is calculated from two images generated from one raw data. More specifically, the image processing unit 110 divides the photoelectric converters 202 corresponding to one microlens 201 into two groups 801 and 802 in the horizontal direction, as shown in FIG. 8. As for data corresponding to the focus detection region in the raw data, the image processing unit 110 integrates the pixel values of pixels corresponding to each microlens 201 in the respective divided groups using the following expressions, thereby generating the pixels of a pair of defocus amount calculation images:

$$\begin{cases} \sum_{a=1}^{6} \sum_{b=1}^{3} (P_{ab}) & \text{left half region} \\ \sum_{a=1}^{6} \sum_{b=4}^{6} (P_{ab}) & \text{right half region} \end{cases}$$

That is, the image processing unit 110 generates an image (A image) obtained from light beams having passed through the left half region of the exit pupil of the imaging optical system 104, and an image (B image) obtained from light beams having passed through the right half region.

In this case, the two images generated from pixel values integrated in the respective groups are images obtained from light beams upon two-division (pupil division) of the exit pupil of the imaging optical system 104. The two light beams have a horizontal light path shift corresponding to a distance between the centers of gravity of the respective light beams. Thus, the two images have an image position shift. Since the two light paths cross each other in each microlens, no image position shift occurs between two images of an in-focus subject.

In the embodiment, the defocus amount calculation images are generated from two groups obtained by dividing a plurality of photoelectric converters 202 corresponding to one microlens 201 into two groups in the horizontal direction. However, the defocus amount calculation image generation method is not limited to this. For example, defocus amount calculation images may be generated by dividing a plurality of photoelectric converters 202 corresponding to one microlens 201 into two groups in a predetermined direction such as the vertical direction, and integrating pixel values in the respective groups.

In step S702, the control unit 101 obtains an image shift amount between the paired defocus amount calculation images generated for each focus detection region. More specifically, the control unit 101 performs correlation calculation using the image signals of paired images for each focus detection region, and obtains an image shift amount (reciprocal of a defocus amount) and a degree of correlation at this time.

In step S703, for each focus detection region, the control unit 101 obtains a focal distance at which the subject is focused on. More specifically, the control unit 101 determines, based on the degree of correlation obtained in the correlation calculation, the reliability of the image shift amount obtained in step S702. If the reliability of the image shift amount is equal to or higher than a predetermined threshold, the control unit 101 multiplies the image shift amount by a predetermined conversion coefficient, obtaining a focal distance at which the subject in the focus detection region is focused on. After focal distances at each of which the subject in the focus detection region is focused on are obtained for all set focus detection regions, the control unit 101 shifts the process to step S704.

In step S704, the control unit 101 decides a focus lens driving position in moving image shooting. In the embodiment, the control unit 101 decides a focus lens driving position so that a focal distance at which the nearest subject among subjects contained in a set focus detection region is focused on becomes the shortest focal distance in the focus range capable of refocusing after shooting.

The focus range capable of refocusing after shooting is set to a range of D±ΔD centered at an arbitrary focal distance D. At this time, letting $F_{NO}$ be the f-number of each microlens of the microlens array 105, N×N be the number of pixels corresponding to one microlens, and Δx be the pixel pitch, ΔD can be calculated by $$\Delta D = F_{NO} \times N \times (N \times \Delta x)$$

Figure 9:
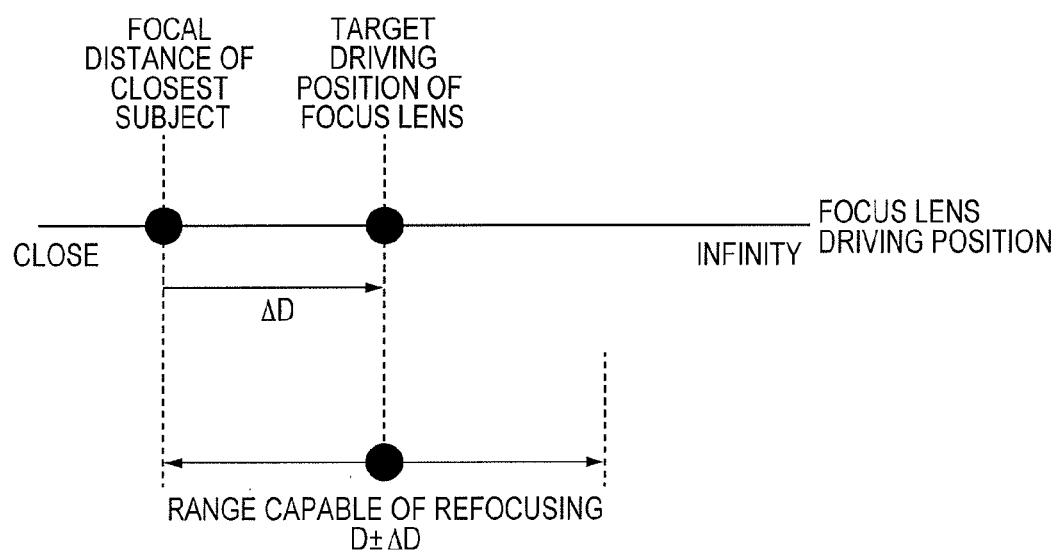
FIG. 9 is a view for explaining the target driving position of a focus lens according to the embodiment of the present invention.

That is, in this step, the control unit 101 decides the driving position (target driving position) of the focus lens at a position moved by ΔD toward infinity from a focal distance at which the nearest subject (closest subject) is focused on, as shown in FIG. 9.

In the embodiment, the focus lens driving position is decided based on the nearest subject. However, the focus lens driving position decision method in shooting is not limited to this. For example, when a plurality of focus detection regions are set, the intermediate value of focal distances at each of which a subject is focused on, which have been obtained for the respective focus detection regions, may be decided as the focus lens driving position.

In step S705, the control unit 101 determines whether the current focus lens driving position coincides with the target driving position decided in step S704. More specifically, the control unit 101 determines whether the current driving position coincides with the target driving position, by determining whether the difference between the current focus lens driving position and the target driving position is equal to or smaller than an allowance. If the control unit 101 determines that the current focus lens driving position coincides with the target driving position, it completes the focus adjustment processing. If the control unit 101 determines that the current focus lens driving position is different from the target driving position, it performs focus lens driving processing in step S706 and then returns the process to step S701.

After performing focus adjustment suited to a subject in the shooting range in this manner, the control unit 101 shifts the process to step S510.

In step S510, the control unit 101 determines whether an operation to start moving image shooting has been input. More specifically, the control unit 101 determines whether it has received a control signal SW2 which is output from the operation input unit 113 when the user presses the shutter button fully. If the control unit 101 determines that it has received the signal SW2, it shifts the process to step S511; if it determines that it has not received the signal SW2, repeats the processing of this step. While repeating this step, the control unit 101 repetitively obtains raw data pertaining to an image signal newly output from the image sensing unit 106, and displays a through image on the display unit 111.

In step S511, the control unit 101 performs focus adjustment processing to move the focus lens to the target driving position.

In step S512, the control unit 101 performs photometry processing for the set focus detection region, decides exposure conditions, and performs exposure control. More specifically, the control unit 101 obtains the luminance component of an image generated as a through image, and decides exposure conditions (exposure time and aperture value) so as to obtain an optimum luminance in the focus detection region. Then, the control unit 101 performs exposure control in accordance with the decided exposure conditions, and obtains raw moving image data pertaining to one frame to be recorded.

In step S513, the control unit 101 records the obtained raw moving image data pertaining to one frame on the recording medium 112. In the embodiment, digital data (raw signal output) of the image signal of the image sensor that is output from the image sensing unit 106 as raw moving image data used to generate a moving image after shooting is recorded as data of one frame on the recording medium 112.

In step S514, the control unit 101 determines whether an operation to end moving image shooting has been input. More specifically, the control unit 101 determines whether it has received a control signal which is output from the operation input unit 113 when the user presses the shutter button to end moving image shooting. If the control unit 101 determines that it has received the control signal to end moving image shooting, it ends the moving image shooting processing; if it determines not to have received the control signal, returns the process to step S511.

By the moving image shooting processing, the digital camera 100 according to the embodiment can generate raw moving image data capable of generating a moving image focused on at an arbitrary focal distance after shooting.

<Refocused Moving Image Generation Processing>

Next, refocused moving image generation processing according to the embodiment to generate, from thus-generated raw moving image data, a moving image in which a designated subject is kept focused on will be described with reference to FIG. 10. Processing corresponding to this flowchart can be implemented by, for example, reading out a corresponding processing program stored in the ROM 102, extracting it in the RAM 103, and executing it by the control unit 101. In the following description, the refocused moving image generation processing starts when, for example, the control unit 101 receives a control signal regarding an instruction to convert selected raw moving image data into a moving image, while the digital camera 100 is set in the playback mode.

In step S1001, the control unit 101 reads out data of the first frame of selected raw moving image data from the recording medium 112, and controls the image processing unit 110 to generate an image (setting image) for setting a subject to be focused on. In the embodiment, the setting image is generated by the same method as that of a through image in moving image shooting processing.

In step S1002, the control unit 101 transmits the generated setting image to the display unit 111, and controls the display unit 111 to display it together with a notification which prompts the user to select a subject to be focused on.

In step S1003, the control unit 101 determines whether a subject to be focused on has been selected. More specifically, the control unit 101 determines whether it has received, from the operation input unit 113, information indicating the position of a subject to be focused on in the setting image within the shooting range. If the control unit 101 determines that a subject to be focused on has been selected, it shifts the process to step S1004; if it determines that no subject to be focused on has been selected yet, repeats the processing of this step. When the control unit 101 determines that a subject to be focused on has been selected, it extracts, from the setting image, a region of a predetermined number of pixels containing the subject to be focused on, and stores it as a tracking template image (pattern image) in the RAM 103.

In step S1004, the control unit 101 determines whether the target frame of a moving image to be generated is the first frame. If the target frame is the first frame, the control unit 101 shifts the process to step S1005; if the target frame is another frame, to step S1010.

In step S1005, the control unit 101 transmits raw data of the target frame to the image processing unit 110, and controls the image processing unit 110 to generate a pair of defocus amount calculation images for a region (refocus plane detection region) of a predetermined number of pixels that is set in accordance with the position of the selected subject to be focused on. Further, the control unit 101 stores, in the RAM 103, an image (A image) obtained from light beams having passed through the left half region of the exit pupil of the imaging optical system 104, and an image (B image) obtained from light beams having passed through the right half region. These images have been generated by the image processing unit 110.

In step S1006, the control unit 101 obtains the image shift amount of the subject to be focused on between the paired defocus amount calculation images generated for the refocus plane detection region. More specifically, the control unit 101 performs correlation calculation using the image signals of the paired images for the refocus plane detection region, and obtains an image shift amount (reciprocal of a defocus amount) and a degree of correlation at this time.

In step S1007, the control unit 101 decides a focal distance (target focal distance: distance from the image sensor to the refocus plane) at which the subject to be focused on in the refocus plane detection region is focused on. More specifically, the control unit 101 determines, based on the degree of correlation obtained in the correlation calculation, the reliability of the image shift amount obtained in step S1006. If the reliability of the image shift amount is equal to or higher than a predetermined threshold, the control unit 101 multiplies the image shift amount by a predetermined conversion coefficient, obtaining a target focal distance at which the subject to be focused on is focused on.

In step S1008, the control unit 101 controls the image processing unit 110 to generate frame data of the moving image focused on at the target focal distance from raw data of the target frame. That is, an image formed on the refocus plane is pseudo-generated.

Figure 11:
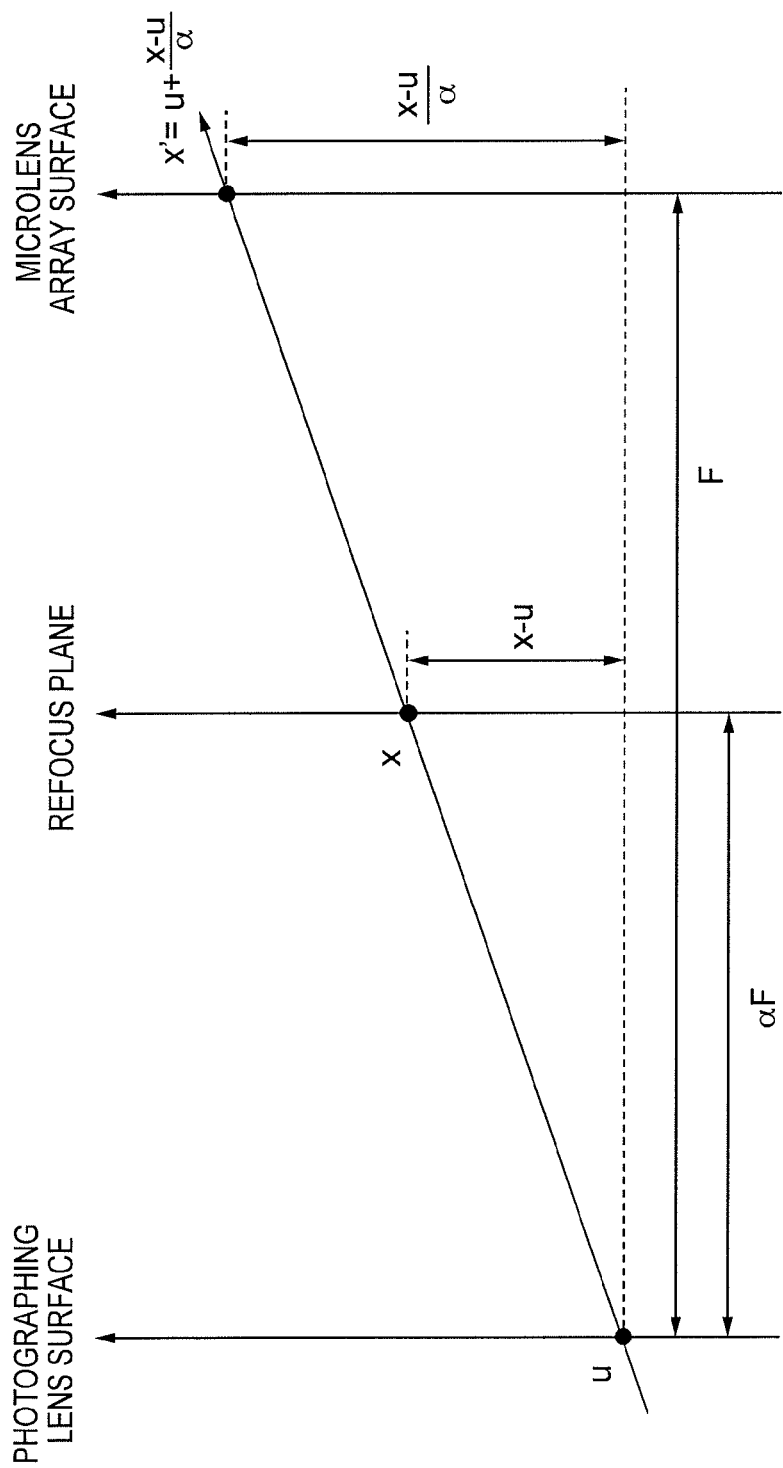
FIG. 11 is a view for explaining a refocused image generation method according to the embodiment of the present invention.

For each pixel of the image formed on the refocus plane, the correspondence between the pupil region of the photographing lens from which a light beam to pass through the pixel exits, and a microlens the light beam enters will be explained with reference to FIG. 11. FIG. 11 shows the light path of a light beam on a horizontal plane (x-z plane) when viewed from the vertical direction at the lateral position of the digital camera 100. The light path of a light beam passing through each pixel of the refocus plane on the x-z plane will be explained. However, the following description also applies to the y-z plane.

Letting (u, v) be the coordinates of the pupil region, and (x, y) be pixel coordinates on the refocus plane, the position coordinates (x', y') of a microlens on the microlens array 105 that receives a light beam having passed through the divided pupil region and the pixel on the refocus plane are given by $$(x', y') = \left(u + \frac{x-y}{\alpha}, v + \frac{y-v}{\alpha}\right)$$

where F is the distance from the photographing lens to the microlens array, and $\alpha F$ is the distance from the photographing lens to the refocus plane ($\alpha$ is a refocus coefficient: variable coefficient for deciding the position of the refocus plane).

Letting L(x', y', u, v) be an output from a photoelectric converter which receives the light beam, a pixel output E(x, y) at the coordinates (x, y) of an image formed on the refocus plane is obtained by integrating L(x', y', u, v) for the pupil region of the photographing lens, and is given by $$E(x, y) = \frac{1}{\alpha^2 F^2} \int \int L\left(u + \frac{x-u}{\alpha}, v + \frac{y-v}{\alpha}, u, v\right) du dv$$

By setting (u, v) as the typical coordinates of the pupil region, the pixel output can be calculated by simple addition.

By solving the integral equation for all pixels in this way, the image processing unit 110 can generate frame data of a moving image focused on at the target focal distance. The control unit 101 records the generated frame data of the moving image on the recording medium 112.

In step S1009, the control unit 101 determines whether data of a subsequent frame exists in the selected raw moving image data. If the control unit 101 determines that data of a subsequent frame exists in the selected raw moving image data, it changes the target frame to the next frame, and shifts the process to step S1004. If the control unit 101 determines that data of a subsequent frame does not exist in the selected raw moving image data, it completes the refocused moving image generation processing.

If the control unit 101 determines in step S1004 that the target frame of a moving image to be generated is not the first frame, it controls the image processing unit 110 to generate a detection image for detecting a subject to be focused on in step S1010. More specifically, the control unit 101 reads out data of the target frame of the selected raw moving image data from the recording medium 112, transmits it to the image processing unit 110, and controls the image processing unit 110 to generate a detection image.

In step S1011, the control unit 101 detects the position of the subject to be focused on that is contained in the detection image of the target frame. More specifically, the control unit 101 transmits, to the image processing unit 110, the detection image (target frame image) of the target frame and a tracking template image which has been generated for a frame preceding the target frame and stored in the RAM 103, and controls the image processing unit 110 to convert them into luminance images. The control unit 101 performs two-dimensional correlation calculation for the target frame image and tracking template image that have been converted into luminance components. Then, the control unit 101 specifies the position of the subject to be focused on in the target frame by pattern matching.

In pattern matching, while relatively shifting the positions of the tracking template image and target frame image, the sum S of the absolute values of Y component differences each between these two images at each position is calculated. For example, when a target frame image A is formed from horizontal M×vertical N pixels, and a tracking template image B is formed from horizontal m×vertical n pixels, the difference sum S at the coordinates (i, j) of the target frame image is given by $$S = \sum_{y=1}^{n} \sum_{x=1}^{m} |A_{i+x-1, j+y-1} - B_{x,y}|$$

Coordinates at which the calculated difference sum S becomes minimum (for 0, perfect matching) indicate a position where the degree of correlation between the two images becomes highest. By this correlation calculation, the control unit 101 can specify the position where the subject to be focused on exists. After specifying the position of the subject to be focused on, the control unit 101 extracts, from the target frame image, a region of a predetermined number of pixels containing the subject to be focused on. Then, the control unit 101 updates the tracking template image in the RAM 103, stores the updated one, and then shifts the process to step S1004. Note that the tracking template image is preferably updated for every frame, but an image extracted from the first frame may remain used.

As described above, the image processing apparatus according to the embodiment can track an arbitrary subject from raw moving image data after shooting, thereby generating an in-focus moving image. More specifically, the image processing apparatus obtains raw moving image data shot by an image sensing apparatus having a microlens array between the imaging optical system and the image sensor. The image processing apparatus detects, from the obtained raw moving image data, the position of a subject to be focused on in the shooting range. The image processing apparatus decides a focal distance at which the subject to be focused on is focused on, and generates, from the raw moving image data, a moving image focused on at the focal distance. At this time, the image processing apparatus generates, from the raw moving image data, a pair of images corresponding to light beams having passed through different regions of the exit pupil of the imaging optical system. Based on a defocus amount at the position of the subject to be focused on that is calculated from the pair of images, the image processing apparatus decides a focal distance at which the subject is focused on.

By this processing, a subject the user wants can be automatically tracked to generate an in-focus moving image without selecting the subject to be focused on in each frame of the moving image by him.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-005660, filed Jan. 13, 2012, which is hereby incorporated by reference herein in its entirety.

What is claimed is:

1. An image sensing apparatus comprising:
  an image sensing unit configured to output data in which respective pixels of image signals of each frame correspond to light beams having different pupil regions through which the light beams have passed in an imaging optical system;
  at least one processor or circuit configured to perform the operations of the following units:
  a display unit configured to perform a display of an image on a display;
  a detection unit configured to detect a specific subject in the image;
  a decision unit configured to decide a focal position at which the specific subject detected by the detection unit is focused on;
  a driving unit configured to decide a driving position of the focus lens based on the focal position decided by the decision unit, and drive the focus lens to the driving position; and
  a recording unit configured to record, on a recording medium moving data including a plurality of frames of the data output from the image sensing unit after driving the focus lens by the driving unit;
  wherein the decision unit generates, from the image signals of a frame of the data, a pair of images respectively corresponding to light beams having passed through different pupil regions of the imaging optical system and calculates, for the decision of the focal position, an image position shift between the pair of images.

2. The apparatus according to claim 1, wherein the pair of images is generated by integrating pixel values of, among pixels of the image signals of a frame, pixels corresponding to light beams having passed through respective regions obtained by dividing the pupil region of the imaging optical system in a predetermined direction.

3. The apparatus according to claim 1, wherein the detection unit detects the position of the specific subject in a detection image generated using, among pixels of the image signals of a frame, pixels corresponding to light beams having passed through a center region in the pupil region of the imaging optical system.

4. The apparatus according to claim 1, wherein the decision unit decides focal positions at which a plurality of specific subjects detected by the detection unit are focused on, and the driving unit decides a driving position of the focus lens based on the focal positions.

5. The apparatus according to claim 4, wherein the at least one processor or circuit further performs an operation of a selection unit configured to select the specific subject from the plurality of specific subjects detected by the detection unit,
  wherein in a frame subsequent to a frame in which the specific subject is selected, out of frames of the data, the detection unit detects, by pattern matching, the position of the selected specific subject in a detection image of a detection target frame using a pattern image of the selected specific subject that is extracted from a detection image of the frame.

6. The apparatus according to claim 4, wherein the driving unit decides the driving position of the focus lens based on an intermediate value of optical distances corresponding to the focal positions at which the plurality of specific subjects are focused on.

7. The apparatus according to claim 4, wherein the driving unit decides the driving position of the focus lens so that the focal positions of the plurality of the specific subjects detected by the detection unit are included in a range capable of refocusing after recording.

8. The apparatus according to claim 4, wherein the displayed image performed by the display unit is generated using pixels corresponding to light beams having passed through a partial region in the pupil region of the imaging optical system.

9. A method of controlling an image sensing apparatus comprising:
  an image sensing step of outputting data in which respective pixels of image signals of each frame correspond to light beams having different pupil regions through which the light beams have passed in an imaging optical system;
  a display step of performing a display of image on a display, wherein the image is generated using pixels corresponding to light beams having passed through a partial region in the pupil region of the imaging optical system;
  a detection step of detecting a specific subject in the image;
  a decision step of deciding a focal position at which the specific subject detected in the detection step is focused on;
  a driving step of deciding a driving position of the focus lens based on the focal position decided in the decision step, and driving the focus lens to the driving position; and
  a recording step of recording, on a recording medium, moving data including a plurality of frames of the data output from the image sensing unit after driving the focus lens;
  wherein in the decision step, a pair of images, respectively corresponding to light beams having passed through different pupil regions of the imaging optical system, is generated from the image signals of a frame of the data and an image position shirt between the pair of images is calculated for the decision of the focal position.

10. A non-transitory computer-readable recording medium recording a program for causing a computer to execute the steps of:
    outputting data in which respective pixels of image signals of each frame correspond to light beams having different pupil regions through which the light beams have passed in an imaging optical system;
    performing a display of image on a display,;
    detecting a specific subject in the image;
    deciding a focal position at which the detected specific subject is focused on;
    deciding a driving position of the focus lens based on the decided focal position, and driving the focus lens to the driving position; and
    recording, on a recording medium, moving data including a plurality of frames of the data output after driving the focus lens,
    wherein in the decision step, a pair of images, respectively corresponding to light beams having passed through different pupil regions of the imaging optical system, is generated from the image signals of a frame of the data and an image position shift between the pair of images is calculated for the decision of the focal position.

11. An image sensing apparatus comprising:
    an image sensing unit configured to output data including pixels which mutually have an image position shift;
    at least one processor or circuit configured to perform operations of the following units:
    a display unit configured to perform a display of an image on a display;
    a detection unit configured to detect a specific subject in the image;
    a decision unit configured to decide a focal position at which the specific subject detected by the detection unit is focused on;
    a driving unit configured to decide a driving position of the focus lens based on the focal position decided by the decision unit, and drive the focus lens to the driving position; and
    a recording unit configured to record, on a recording medium, moving data including a plurality of frames of the data output from the image sensing unit after driving the focus lens by the driving unit,
    wherein the decision unit generates, from the image signals of a frame of the data, a pair of images which mutually have an image position shift and calculates, for the decision of the focal position, the image position shift.

12. A method of controlling an image sensing apparatus comprising:
    outputting, by an image sensing unit, data including pixels which mutually have an image position shift;
    performing a display of an image on a display;
    detecting a specific subject in the image;
    deciding a focal position at which the detected specific subject is focused on;
    deciding a driving position of the focus lens based on the decided focal position;
    driving the focus lens to the driving position; and
    recording, on a recording medium, moving data including a plurality of frames of the data output from the image sensing unit after driving the focus lens,
    wherein, from the image signals of a frame of the data, a pair of images which mutually have an image position shift is generated and the image position shift is calculated for the decision of the focal position.

* * * * *